(12) United States Patent
Goossens

(10) Patent No.: US 7,309,755 B2
(45) Date of Patent: Dec. 18, 2007

(54) METHOD OF PRODUCING POLYCARBONATE ARTICLES BY ROTATION MOLDING AND ROTATION MOLDED ARTICLES MADE BY THE METHOD

(75) Inventor: Johannes Martinus Dina Goossens, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 11/210,451

(22) Filed: Aug. 24, 2005

(65) Prior Publication Data

US 2007/0049723 A1    Mar. 1, 2007

(51) Int. Cl.
    C08G 64/00    (2006.01)

(52) U.S. Cl. .................. 528/196; 264/176.1; 264/219; 514/553; 514/554; 514/555; 514/562; 528/198; 549/408; 549/511

(58) Field of Classification Search ............ 264/176.1, 264/219; 514/553, 554, 555, 562; 528/196, 528/198; 549/408, 511
    See application file for complete search history.

(56) References Cited

U.S. PATENT DOCUMENTS

| | | | |
|---|---|---|---|
| 3,439,079 A | 4/1969 | McDowell | |
| 3,926,565 A | 12/1975 | Birtigh et al. | |
| 4,044,811 A | 8/1977 | Dudek et al. | |
| 4,217,438 A | 8/1980 | Brunelle et al. | |
| 5,352,747 A | 10/1994 | Ohtsuka et al. | |
| 5,660,428 A | 8/1997 | Catlin | |
| 6,124,422 A * | 9/2000 | Mestanza | 528/198 |
| 6,136,945 A * | 10/2000 | Mestanza | 528/196 |
| 6,177,536 B1 * | 1/2001 | Anamizu et al. | 528/196 |
| 6,495,654 B1 * | 12/2002 | Volkers et al. | 528/196 |
| 6,504,000 B1 * | 1/2003 | Volkers et al. | 528/196 |
| 6,518,357 B1 | 2/2003 | Rajagopalan et al. | |
| 6,583,258 B1 | 6/2003 | Lemmon et al. | |
| 6,747,119 B2 * | 6/2004 | Brack et al. | 528/198 |
| 6,773,787 B2 | 8/2004 | Maas et al. | |
| 2003/0207082 A1 | 11/2003 | Maas et al. | |
| 2004/0103717 A1 * | 6/2004 | Westernacher et al. | 73/40.7 |

FOREIGN PATENT DOCUMENTS

| | | |
|---|---|---|
| JP | 1993043678 A | 2/1993 |
| JP | 1993269769 A | 10/1993 |
| JP | 2002020496 A | 1/2002 |
| JP | 2002020607 A | 1/2002 |
| JP | 2003026815 A | 1/2003 |
| JP | 2004124062 A | 4/2004 |
| JP | 2005043678 A | 2/2005 |

OTHER PUBLICATIONS

PCT International Search Report for International Patent Application No. PCT/US2006/029976.

* cited by examiner

*Primary Examiner*—Terressa Boykin

(57) ABSTRACT

A method for making a polycarbonate article is described wherein the article is made by rotation molding a melt polycarbonate having a weight average molecular weight from 25,000 to about 36,000. The melt polycarbonate is produced by transesterifying a diaryl carbonate and a dihydroxy compound in the presence of a catalyst system to form an intermediate aromatic polycarbonate, wherein the catalyst system comprises a first catalyst selected from the group consisting of alkali metal salts and alkaline earth metal salts; and a second catalyst selected from the group consisting of quaternary ammonium compounds and quaternary phosphonium compounds; adding to said intermediate aromatic polycarbonate a catalyst quencher, and rotation molding the aromatic polycarbonate at a temperature from about 305° C. to about 360° C. Also disclosed are polycarbonate light diffusive articles produced by rotation molding.

18 Claims, No Drawings

METHOD OF PRODUCING POLYCARBONATE ARTICLES BY ROTATION MOLDING AND ROTATION MOLDED ARTICLES MADE BY THE METHOD

FIELD OF THE INVENTION

This invention relates to a method for making polycarbonate articles by rotation molding. More specifically this invention relates to a method for making rotation molded polycarbonate articles from a melt polycarbonate composition. In another embodiment the invention relates to a light diffusing rotation molded article.

Rotation molding is a widely used technique to inexpensively prepare relatively large molded polymer articles, such as canoes, dolls, light fixtures, furniture etc. In comparison with injection molding, no expensive molds or high-pressure equipment is needed, allowing for low investment, which affords the cost effective production of a small series of articles. Rotation molded articles are produced with low-pressure conditions and hence have very low molded-in stresses. Common polymers used for rotation molding, or roto-molding as it is often called, are poly-olefins such as polyethylene and polypropylene.

Aromatic polycarbonate is a polymer that is noted for its transparency and excellent mechanical properties when used in a large variety of applications. For example, polycarbonate is used for optical data carriers such as CDs and DVDs, automotive parts, sheets and household appliances. Polycarbonate articles made by rotation molding have the advantage of an intrinsically better chemical resistance because of the low molded in stress. Chemical stress cracking is a known problem with injection molded polycarbonate articles. Molded in stresses can be made visible by inspecting an article under polarized light. Up to now rotation molding of polycarbonate has not been widely practiced due to technical difficulties. Polycarbonate requires relatively high processing temperatures and pressures for effective molding. Typically temperatures above 300° C., and high pressures as employed with extrusion or injection molding equipment are required. Only at these high pressures and temperatures is the viscosity of polycarbonate low enough to efficiently fill a mold. However, polycarbonate is known to be sensitive to degradation at the high temperatures and long residence times, commonly used in rotation molding. To mitigate these viscosity problems, previous attempts to rotation mold polycarbonate have focused on relatively low temperature molding of low molecular weight polycarbonate, which has relatively low viscosity. Unfortunately, low molecular weight polycarbonate does not exhibit very good mechanical properties, and in particular lacks impact strength. Other troublesome issues encountered in rotation molding of polycarbonate are surface defects and mold release problems. Because of these problems, aromatic polycarbonates have not previously been widely used in commercial roto-molding Consequently there is a need for a method of rotation molding aromatic polycarbonate that addresses one or more of the above issues.

SUMMARY OF THE INVENTION

Disclosed herein is a method for making a polycarbonate article comprising:

processing a melt aromatic polycarbonate in a rotation molding apparatus into a rotation molded article characterized in that
1. said aromatic polycarbonate is produced by a melt reaction process comprising the steps of:
   a. transesterifying a diaryl carbonate and a dihydroxy compound in the presence of a catalyst system to form an intermediate aromatic polycarbonate, wherein said catalyst system comprises:
      (i) an alpha catalyst selected from the group consisting of alkali metal salts and alkaline earth metal salts; and
      (ii) a beta catalyst selected from the group consisting of quaternary ammonium compounds and quaternary phosphonium compounds;
   b. adding to said intermediate aromatic polycarbonate a catalyst quencher; and
2. said aromatic polycarbonate is rotation molded into said article at a rotation molding temperature between 305° C. to 360° C.

Also disclosed is an aromatic polycarbonate article produced by rotation molding wherein the aromatic polycarbonate is produced by a melt transesterification process and has a weight average molecular weight from 25,000 up to about 36,000. Further there is disclosed a light diffusive rotation molded article.

DETAILED DESCRIPTION OF THE INVENTION

Disclosed herein are several embodiments of a rotation molded polycarbonate article and methods for making such rotation molded polycarbonate article.

In one embodiment there is disclosed a method for making a polycarbonate article comprising the steps of:
1) producing an aromatic polycarbonate by a melt reaction process comprising the steps of:
   a) transesterifying a diaryl carbonate and a dihydroxy compound in the presence of a catalyst system to form an intermediate aromatic polycarbonate, wherein said catalyst system comprises,
      (i) an alpha catalyst selected from the group consisting of alkali metal salts and alkaline earth metal salts; and
      (ii) a beta catalyst selected from the group consisting of quaternary ammonium compounds and quaternary phosphonium compounds;
   b) adding to said intermediate aromatic polycarbonate a catalyst quencher; and
2) rotation molding the polycarbonate into an article at a rotation molding temperature between 305° C. to 360° C.

In another embodiment there is disclosed an aromatic polycarbonate article produced by rotation molding wherein the aromatic polycarbonate is produced by a melt transesterification process and has a weight average molecular weight from 25,000 up to about 36,000 as measured by GPC against polycarbonate standards.

In another embodiment an article is produced by rotation molding from a polycarbonate composition comprising
   a. a melt polycarbonate resin;
   b. 0.01 to 5% by weight of the total composition of a poly alkyl silsesquioxane based diffusing agent; and
   c. 0 to 0.5% by weight stabilizer based on the total composition including the stabilizer.

As stated above, the method of the present invention relates to articles produced by rotation molding of melt aromatic polycarbonate. As used herein, the terms "polycarbonate", "polycarbonate composition", "aromatic polycarbonate" and "composition comprising aromatic carbonate chain units" includes polymers and compositions having structural units of the formula (1):

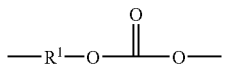

wherein greater than or equal to about 60 percent of the total number of $R^1$ groups are aromatic radicals and the balance thereof are aliphatic, alicyclic, or aromatic radicals. Specifically, $R^1$ is an aromatic radical and, more specifically, a radical of the formula (2):

$$-A^1-Y^1-A^2- \qquad (2)$$

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative non-limiting examples of the $Y^1$ radicals are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene and adamantylidene. In another embodiment, zero atoms separate $A^1$ from $A^2$, with an illustrative example being biphenyl. The bridging radical $Y^1$ can be a saturated hydrocarbon group such as methylene, cyclohexylidene or isopropylidene.

The polycarbonate manufacturing process comprises the step of reacting an aromatic dihydroxy compound with a compound capable of introducing a carbonate bond. In the Schotten-Baumann reaction, commonly known as an 'interfacial' reaction, a dihydroxy compound is reacted with a carbonyl halide in a solvent system containing an organic solvent such as methylene chloride and water. Phosgene is often employed as the carbonyl halide. A base is introduced during the reaction as an acid scavenger for pH control.

Another process for producing polycarbonate utilizes a carbonic acid diester as the carbonate source. The dihydroxy compound and the carbonic acid diester are reacted in a transesterification reaction in the melt. This process has the advantage that it does not employ the highly toxic phosgene, nor does it employ organic solvents. Commonly used carbonic acid diesters are diaryl carbonates, such as diphenyl carbonate (DPC) or bismethyl salicyl carbonate (BMSC).

Among these processes, the use of the melt transesterification process is the preferred process for this invention.

Suitable dihydroxy compounds are those in which only one atom separates $A^1$ and $A^2$. As used herein, the term "dihydroxy compound" includes, for example, bisphenol compounds having the general formula (3) as follows:

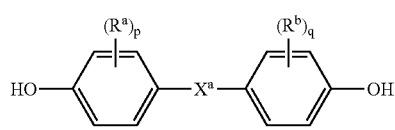

wherein $R^a$ and $R^b$ each represent a halogen atom or a monovalent hydrocarbon group and may be the same or different; p and q are each independently integers from 0 to 4; and $X^a$ represents one of the groups of formula (4):

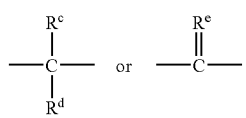

wherein $R^c$ and $R^d$ each independently represent a hydrogen atom or a monovalent linear or cyclic hydrocarbon group and $R^e$ is a divalent hydrocarbon group.

Some illustrative, non-limiting examples of dihydroxy compounds suitable for forming the polycarbonate oligomers include the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (3) includes bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl)phenylmethane; 2,2-bis(4-hydroxy-1-methylphenyl) propane; 1,1-bis(4-hydroxy-t-butylphenyl) propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Preferably, the polycarbonates are linear homopolycarbonates that are capable of branching upon addition of the branching agent in accordance with this disclosure.

Other bisphenol compounds that may be used in the polycondensation of polycarbonate include those of formula (5):

wherein, $R^f$ is a halogen atom of a hydrocarbon group having 1 to 10 carbon atoms or a halogen substituted hydrocarbon group; n is a value from 0 to 4. When n is at least 2, $R^f$ may be the same or different. Non-limiting examples of bisphenol compounds that may be represented by the formula (5), are resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol and 5-cumyl resorcinol; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone and 3-cumyl hydroquinone; or combinations comprising at least two of the foregoing bisphenol compounds.

Bisphenol compounds such as 2,2,2',2'-tetrahydro-3,3,3',3'-tetramethyl-1,1'-spirobi-[IH-indene]-6,6'-diol represented by formula (6) may also be used.

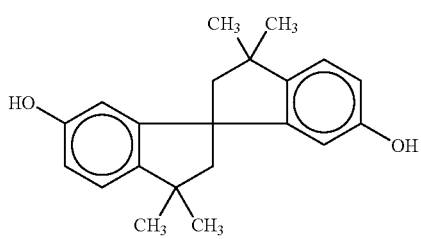

(6)

Suitable polycarbonates further include those derived from bisphenols containing alkyl cyclohexane units. Such polycarbonates have structural units corresponding to the formula (7):

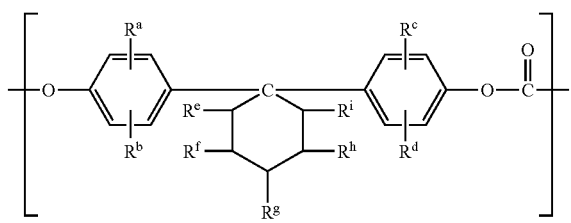

(7)

wherein $R^a$—$R^d$ are each independently hydrogen, $C_{1-12}$ alkyl, or halogen; and $R_e$—$R_i$ are each independently hydrogen, $C_{1-12}$ alkyl. The residue may be aliphatic or aromatic, straight-chain, cyclic, bicyclic, branched, saturated, or unsaturated. The alkyl residue may contain heteroatoms over and above the carbon and hydrogen members of the substituent residue. Thus, when specifically noted as containing such heteroatoms, the alkyl residue may also contain carbonyl groups, amino groups and hydroxyl groups, or it may contain heteroatoms within the backbone of the alkyl residue. Alkyl cyclohexane containing bisphenols, for example the reaction product of two moles of a phenol with one mole of a hydrogenated isophorone, are useful for making polycarbonate polymers with high glass transition temperatures and high heat distortion temperatures. Such isophorone bisphenol-containing polycarbonates have structural units corresponding to the formula (8):

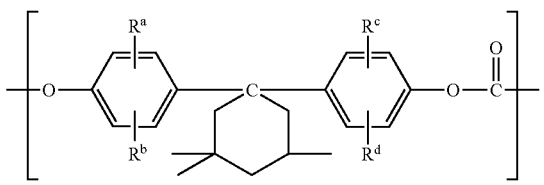

(8)

wherein $R_a$—$R_d$ are as defined above. These isophorone bisphenol based polymers, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name.

In some more typical embodiments, the aromatic dihydroxy has the structure of formula (9):

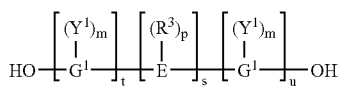

(9)

wherein each $G^1$ is independently an aromatic group, such as, for example phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. and may consist of two or more alkylene or alkylidene groups connected by a moiety different from alkylene or alkylidene, such as an aromatic linkage; a tertiary amino linkage; an ether linkage; a carbonyl linkage; a silicon-containing linkage; a sulfur-containing linkage such as sulfide, sulfoxide, sulfone, etc.; or a phosphorus-containing linkage such as phosphinyl, phosphonyl, etc. In addition, E may be a cycloaliphatic group. $R^3$ is hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, hydrogen or a monovalent hydrocarbon group, or an oxy group such as OR; it being only desirable that $Y^1$ be inert to and unaffected by the reactants and reaction conditions used to prepare the polymer. The letter m is a whole number from and including zero through the number of positions on $G^1$ available for substitution; p is a whole number from and including zero through the number of positions on E available for substitution; t is a natural number equal to at least one; s is either zero or one; and u is any natural number including zero. Suitable particular examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.; a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy.

In the aromatic dihydroxy compound (9) above, when more than one $Y^1$ substituent is present, they may be the same or different. The same holds true for the $R^3$ substituent. Where s is zero in formula (9) and u is not zero, the aromatic rings are directly joined with no intervening alkylidene or other bridge (e.g., 4,4'-dihydroxybiphenyl). The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments, the parameters t, s, and u are each one; both $G^1$ radicals are unsubstituted phenylene radicals; and E is an alkylidene group such as isopropylidene. In some particular embodiments, both $G^1$ radicals are p-phenylene, although both may be o- or m-phenylene or one o- or m-phenylene and the other p-phenylene.

Some non-limiting examples of aromatic dihydroxy compounds of formula (9) are illustrated by the following list: 2,4'-dihydroxydiphenylmethane, bis(2-hydroxyphenyl) methane, bis(4-hydroxyphenyl)methane, bis(4-hydroxy-2,6-dimethyl-3-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl) cyclohexane (DMBPC), 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimidine (PPPBP) 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl) benzene, 1,4-bis(2-(4-hydroxy-3-methylphenyl)-2-propyl) benzene 2,4'-dihydroxyphenyl sulfone, 4,4'-dihydroxydiphenylsulfone (BPS), BPF, 2,6-dihydroxy naphthalene; hydroquinone; resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi [1H-indene]-6,6'-diol. The most typical aromatic dihydroxy compound is Bisphenol A (BPA).

In preparing the polycarbonate, usually about 1.0 mole to about 1.30 moles of a carbonic acid diester are utilized for every 1 mole of the dihydroxy compound. In one embodiment, about 1.01 moles to about 1.20 moles of the carbonic diester are utilized. Optionally, the carbonic diester acid component for preparing the polycarbonate may contain a portion, up to 50 mole % of a dicarboxylic acid or its ester, such as terephthalic acid or diphenyl isophthalate, to prepare polyester polycarbonates.

The synthesis of polycarbonates may be conducted in the presence of a catalyst, for example, to promote the transesterification reaction. Examples of suitable catalysts include quaternary ammonium compounds, quaternary phosphonium compounds, alkali metal salts and alkaline earth metal salts, such as alkali metal or alkaline earth metal oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds; acetates of calcium, magnesium, zinc, lead, tin, manganese, cadmium, and cobalt; and compound catalyst systems such as a nitrogen-containing basic compound and a boron compound; a combination of a nitrogen-containing basic compound and an alkali (alkaline earth) metal compound; a combination of a nitrogen-containing basic compound, an alkali (alkaline earth) metal compound, and a boron compound; or combinations comprising at least two of the foregoing catalysts. When more than one catalyst is employed, each may be incorporated into the melt at the same stage or at different stages of the reaction.

Preferably, the catalyst is a quaternary ammonium compound or a quaternary phosphonium compound. Illustrative non-limiting examples include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, tetrabutyl phosphonium acetate and dimethyl diphenyl ammonium hydroxide.

The appropriate level of catalyst will depend in part on how many catalysts are being employed. In general, the total amount of catalyst is usually in the range of about $1\times10^{-8}$ to about 1.0 mole per mole of the dihydroxy compound. Optionally, when more than one catalyst is employed, each may be incorporated into the melt at a different stage of the reaction.

In a particularly preferred embodiment a catalyst system comprising an alkali metal salt or an earth alkaline metal salt, (known as an alpha catalyst) in combination with a quaternary ammonium or a quaternary phosphonium compound (known as a beta catalyst) is used. In one embodiment both catalysts are added to the reaction mixture at the same time. In another embodiment the beta catalyst is added to the reaction mixture in a first oligomerization step, and the alpha catalyst is subsequently added in a second step.

Terminators or endcapping agents may also be used during the manufacture of the polycarbonate. Examples of terminators include phenol, p-tert-butylphenol, p-cumylphenol, octylphenol, nonylphenol and other endcapping agents well-known in the art.

In order to obtain a faster and/or greater build in molecular weight of the polycarbonate a coupling agent such as a bis-alkylsalicyl carbonate may also be added to the polycarbonate. Examples of bis-alkylsalicyl carbonates include, but are not limited to, bis-methyl, ethyl or propyl salicyl carbonate, bis-phenyl or benzyl salicyl carbonate, bis(2-benzoylphenyl) carbonate, BPA-bis-2-alkoxyphenylcarbonate, BPA-bis-2-aryloxyphenylcarbonate, and BPA-bis-2-benzoylphenylcarbonate.

The process of manufacturing polycarbonates generally takes place in a series of reactors, commonly referred to as a reactor train in the art. In general, the temperature is increased and the pressure is reduced along the reactor train. Since the reaction is an equilibrium reaction, byproduct aryl alcohol (e.g. phenol) is continuously removed from the reactors to ensure the desired or targeted molecular weight. The reaction preferably occurs at temperatures greater than about 230° C., with about 270° C. to about 310° C. more preferred. The pressure of the reaction is preferably reduced to a pressure less than about 100 Pa, with about 20 to about 50 Pa more preferred. Once the final polycarbonate target specifications have been reached, a quencher composition may be added if desired. The mixture is passed through an extruder and pelletized. The reaction can be carried out by either a batch mode or a continuous mode.

The quencher composition generally comprises an acid or acid derivative dissolved in a carrier. Suitable quencher compounds are sulfonic acid class compounds or derivatives thereof. Non-limiting examples of sulfonic acid class compounds include sulfonates such as benzenesulfonate, p-toluenesulfonate, methyl benzenesulfonate, ethylbenzene sulfonate, butyl benzenesulfonate, octyl benzenesulfonate and phenyl benzenesulfonate, sulfonic acid esters such as methyl p-toluenesulfonate, ethyl p-toluenesulfonate, butyl p-toluene sulfonate, octyl p-toluenesulfonate and phenyl p-toluenesulfonate, and sulfonic acid ammonium salts such as ammonium p-toluene sulfonate. Moreover, sulfonic acid compounds such as trifluoromethanesulfonic acid, and naphtalenesulfonic acid may also be used. Another class of quencher compounds include compounds having at least one acid or acid ester moiety and at least one amine moiety. Non-limiting examples include N-(2-hydroxyethyl)piperazine-N'-3-propanesulfonic acid, 1,4-piperazine bis (ethanesulfonic acid) and 5-dimethylamino-1-naphthalenesulfonic acid. Among these substances methyl p-toluenesulfonate, ethyl p-toluenesulfonate and butyl p-toluenesulfonate are preferred. In one embodiment the quencher composition is added in a carrier comprising monomers employed in the reaction optionally in combination with a solvent. An exemplary embodiment utilizes butyl p-toluenesulfonate in a diphenyl carbonate/toluene carrier.

Generally the quencher composition is added in a 2 to 20-fold molar excess of active quencher compound in the quencher composition relative to the alkali metal or earth alkaline metal catalyst. In one embodiment the quencher is added in about 5 to 10 fold molar excess of active quencher compound in the quencher composition. The amount of active quencher compound in the total quencher composition (active quencher compound+carrier) generally varies from 1 to 30% by weight of the total quencher composition.

In one embodiment of the method of the present invention, a first reaction stage comprises charging at least one dihydroxy aromatic compound, at least one diaryl carbonate and at least one quaternary ammonium or quaternary phosphonium (beta) transesterification catalyst to a reactor and reacting under conditions which comprise heating at a temperature in a range between about 150 and about 300° C., preferably between about 170 and about 280° C., and pressure of between about 2 atmospheres and about 1.0 mmHg, preferably between about atmospheric pressure and about 10 mmHg, for a time period of between about 15 minutes and about 3 hours, preferably between about 30 minutes and about 2 hours. The first stage reaction provides an oligomeric polycarbonate having a weight average molecular weight, $M_w$, of less than about 10,000 Daltons and comprising structural units derived from the diaryl carbonate and dihydroxy aromatic compounds employed. The diaryl carbonate and dihydroxy aromatic compounds are each employed in an amount corresponding to between about 0.90 and about 1.30, preferably between about 0.95 and about 1.20 moles diaryl carbonate per mole of dihydroxy aromatic compound. The beta transesterification catalyst is employed in an amount corresponding to between about $1\times10^{-7}$ and about $1\times10^{-3}$, preferably between about $1\times10^{-6}$ and about $1\times10^{-3}$ moles of said beta catalyst per mole of dihydroxy compound.

Following the first reaction stage, the reaction mixture comprising the oligomeric polycarbonate is further reacted, according to the method of the present invention, in a second reaction stage under conditions which comprise heating at a temperature in a range between about 250 and about 350° C., preferably between about 260 and about 310° C., and a pressure of between about 10,000 Pa and about 100 Pa, preferably between about 2000 Pa and about 100 Pa, for a time period of between about 15 minutes and about 3 hours, preferably between about 1 and about 2 hours. In addition to temperature and pressure regimes which differ from the temperature and pressure regimes employed in the first reaction stage, the second reaction stage comprises the addition of an alkali metal salt or earth alkaline metal salt co-catalyst (alpha catalyst) to the reaction mixture. The alpha co-catalyst is typically added at the beginning of the second reaction stage, but may be added at any time during the second reaction stage provided sufficient time remains during said second reaction stage for the catalytic effect of the alpha co-catalyst to be manifested. The alpha co-catalyst is added in any catalytically effective amount, however, it is advantageous to introduce as little of the co-catalyst as possible since alpha co-catalysts are known to catalyze the Fries rearrangement in polycarbonates. Typically, the alpha co-catalyst is employed in an amount corresponding to between about $1\times10^{-8}$ and about $1\times10^{-4}$, preferably between about $1\times10^{-8}$ and about $1\times10^{-5}$ moles alpha co-catalyst per mole dihydroxy aromatic compound. A portion of the aryl alcohol (phenol) by-product generated during the first reaction stage is present during the second reaction stage. In addition, the polymerization reaction of the second reaction stage gives rise to additional aryl alcohol (phenol) by-product. Thus, the second reaction stage comprises distilling phenolic by-product from the reaction mixture in order to drive the polymerization reaction toward completion. The polymerization reaction which occurs during the second reaction stage provides a product polycarbonate comprising structural units derived from the diaryl carbonate and dihydroxy compound employed, and has a weight average molecular weight, $M_w$, of at least about 18,000, preferably at least about 22,000, more preferably about 25,000 and most preferably about 27,000.

In one embodiment, the product polycarbonate prepared for use in the method of the present invention comprises between about 200 and about 3000, preferably between about 100 and about 2000 parts per million (ppm) Fries product, said Fries product furnishing upon complete hydrolysis of the product polycarbonate, a carboxy bisphenol having structure (10)

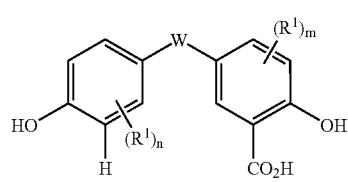

(10)

wherein $R^1$ is at each occurrence a halogen atom, nitro group, cyano group, $C_1$-$C_{20}$ alkyl group, $C_4$-$C_{20}$ cycloalkyl group, or $C_6$-$C_{20}$ aryl group; n and m are independently 0, 1, 2 or 3; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical or the group,

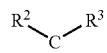

wherein $R^2$ and $R^3$ are independently a hydrogen atom, $C_1$-$C_{20}$ alkyl group, $C_4$-$C_{20}$ cycloalkyl group, or $C_4$-$C_{20}$ aryl group; or $R^2$ and $R^3$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$ cycloalkyl groups or a combination thereof. Examples of carboxy bisphenols having structure (10) include 2-(3-carboxy-4-hydroxyphenyl)-2-(4-hydroxyphenyl)propane; 2-(3-carboxy-4-hydroxy-5-methylphenyl)-2-(4-hydroxy-3-methylphenyl)propane and 2-(3-carboxy-4-hydroxy-6-methylphenyl)-2-(4-hydroxy-2-methylphenyl)propane. The carboxy bisphenol designated 2-(3-carboxy-4-hydroxyphenyl)-2-(4-hydroxyphenyl)propane is also referred to as carboxy bisphenol A.

Generally, in the method of the present invention, the weight average molecular weight of the melt polycarbonate can be from 22,000 to 36,000. In one embodiment the weight average molecular weight is from 25,000 to 35,000. In another embodiment the weight average molecular weight is from 27,000 to 31,000. The weight average molecular weights are measured by Gel Permeation Chromatography and are expressed against polycarbonate standards.

Generally during the rotation molding cycle the mold is filled with polymer at a low temperature, heated up to the rotation molding temperature to allow the polymer to soften and distribute itself and adopt the shape of the mold. After a period at the rotation molding temperature, the mold temperature will be reduced to the starting temperature to cool off the article so that it can be removed from the mold. The rotation molding cycle time is to be understood as the time from the filling of the mold at low temperature until the mold is ready to be filled again.

Generally the temperature of rotation molding (or rotation molding temperature) is selected such that cycle time of the rotation molding cycle is minimized while ensuring at the same time excellent mold filling and product appearance. The temperature of rotation molding is to be understood as the maximum temperature reached during the rotation molding cycle. Typically temperature of rotation molding will be from about 305° C. to about 360° C. In an embodiment the temperature will be from about 315° C. to about 340° C., or from about 320° C. to about 335° C.

The method of the present invention will allow rotation molding of articles requiring a substantially long cycle time. Generally during the rotation molding cycle the mold is filled with polymer at a low temperature, heated up to the rotation molding temperature to allow the polymer to soften, distribute itself and adopt the shape of the mold. After a period at the rotation molding temperature, the mold temperature will be reduced to the starting temperature to cool off the article so that it can be removed from the mold. Articles with complex shapes and/or substantial wall thickness consequently can be prepared by the method of the present invention while maintaining excellent quality in terms of transparency, surface appearance and ease of mold release. In one embodiment of the invention the cycle times may be greater than 25 minutes. In another embodiment the cycle time may be greater than 50 minutes. In yet another embodiment the cycle time may be greater than 75 minutes. In another embodiment the cycle time will be greater than 100 minutes.

The composition can further comprise a UV absorbing additive. The UV absorbing additive facilitates the preservation of the IR absorbing additive by increasing its hydrolytic stability. Suitable non-limiting examples of UV absorbing additives are benzophenones such as 2,4 dihydroxybenzophenone, 2-hydroxy-4-methoxybenzophenone, 2-hydroxy-4-n-octoxybenzophenone, 4-dodecyloxy-2-hydroxybenzophenone, 2-hydroxy-4-octadecyloxybenzophenone, 2,2' dihydroxy-4 methoxybenzophenone, 2,2'dihydroxy-4,4'dimethoxybenzophenone, 2,2' dihydroxy-4 methoxybenzophenone, 2,2',4,4' tetra hydroxybenzophenone, 2-hydroxy-4-methoxy-5 sulfobenzophenone, 2-hydroxy-4-methoxy-2'-carboxybenzophenone, 2,2'dihydroxy-4,4'dimethoxy-5 sulfobenzophenone, 2-hydroxy-4-(2-hydroxy-3-methylaryloxy) propoxybenzophenone and 2-hydroxy-4 chlorobenzopheone; benzotriazoles such as 2-(2-hydroxy-5-tert-octylphenyl)-benzotriazole, 2-hydroxy-4-n-octoxy benzophenone 2-(2-hydroxy-5-methyl phenyl) benzotriazole, 2-(2-hydroxy-3',5'-di-tert-butyl phenyl) benzotriazole, and 2-(2-hydroxy-X-tert, butyl-5'-methyl-phenyl) benzotriazole; salicylates such as phenyl salicylate, carboxyphenyl salicylate, p-octylphenyl salicylate, strontium salicylate, p-tert butylphenyl salicylate, methyl salicylate and dodecyl salicylate; and also other ultraviolet absorbents such as resorcinol monobenzoate, 2 ethyl hexyl-2-cyano, 3-phenylcinnamate, 2-ethyl-hexyl-2-cyano-3,3-diphenyl acrylate, ethyl-2-cyano-3,3-diphenyl acrylate and 2-2'-thiobis(4-t-octylphenolate)-1-n-butylamine, or combinations comprising at least one of the foregoing UV absorbing additives. Preferred commercially available UV absorbers are TINUVIN™ 234, TINUVIN™ 329, TINUVIN™ 350 and TINUVIN™ 360, commercially available from Ciba Specialty Chemicals; CYASORB™ UV absorbers, available from Cyanamide, such as 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis (4H-3,1 -benzoxazin-4-one); 1,3-bis[(2-cyano-3,3-diphenylacryloyl)oxy]-2,2-bis[[(2-cyano-3,3-diphenylacryloyl)oxy]methyl]propane.

The composition can further comprise thermal stabilizers. Suitable thermal stabilizers include phosphites, phosphonites, phosphines, hindered amines, hydroxyl amines, phenols, acryloyl modified phenols, hydroperoxide decomposers and benzofuranone derivatives, or combinations comprising at least two of the foregoing thermal stabilizers. Suitable thermal stabilizers that are commercially available are phosphites such as IRGAPHOS 168, DOVERPHOS S-9228, ULTRANOX 641 and ALKANOX 240. If desirable, an optional co-stabilizer such as a aliphatic epoxy or a hindered phenol anti-oxidant such as IRGANOX 1076 or IRGANOX 1010, both from Ciba Specialty chemicals may also be added to improve thermal stability of the composition. The typical thermal stabilizers are phosphites.

It is generally desirable to add the thermal stabilizer in an amount of about 0.001 to about 3 wt %, based on the total weight of the composition. In one embodiment, the thermal stabilizer may be added in amounts of about 0.002 to about 0.5 wt %, based on the total weight of the composition. In another embodiment, the thermal stabilizer may be added in amounts of about 0.005 to about 0.2 wt %, based on the total weight of the composition. In yet another embodiment, the thermal stabilizer may be added in amounts of about 0.01 to about 0.1 wt %, based on the total weight of the composition. If a co-stabilizer is added, it is generally desirable to add it in an amount of about 0.001 to about 2 wt %, based on the total weight of the composition.

The composition can further comprise flame retardant salts. Non-limiting examples of suitable flame retardant salts include alkali metal or earth alkaline metal salts of alkyl sulphonates; alkali metal or earth alkaline metal salts of perfluoro alkyl sulphonates and alkali aryl sulphon sulphonates. Commercial flame retardant salts that are readily available are Rimar® Salt (potassium perfluoro butyl sulphonate) and KSS (potassium diphenylsulphon-3-sulphonate).

In one embodiment it is desirable to produce light diffusive opal parts. An example is a decorative light fixture where the opal effect allows for diffuse lighting by shielding the light source, e.g. a clear incandescent light bulb or halogen light, from direct viewing by the viewer. In order to obtain light diffusive opal parts, a light diffusive agent like barium sulfate or cross-linked PMMA beads is commonly added to the composition. In combination with pigments like titanium dioxide and optional dyes the desired light diffusive opal effect can be obtained. However the use of barium sulfate containing polycarbonate composition in a rotation molding process can result in significant yellowing and polymer degradation due to limited stability of the polycarbonate composition. Similarly the cross-linked PMMA beads tend to decompose at temperatures above 300° C. and thereby generate volatile components during the rotation molding process. Volatile components may cause irregular surface appearance and unacceptable article aesthetics. The present inventors have found that when instead of barium sulfate or cross-linked PMMA a polyalkyl silsesquioxane light diffusive agent is used, an excellent light diffusive opal effect can be obtained with good article aesthetics. An example of a commercially available suitable polyalkyl silsesquioxane light diffusive agent is Tospearl™ 120, available from GE Toshiba Silicones. This opal effect has been disclosed in U.S. Pat. No. 6,773,787 to Maas et al., titled "Light Diffusing Articles And Methods To Manufacture Thereof".

The method of the invention and the articles formed by rotational molding are further illustrated by the following non-limiting examples, which were prepared from the components set forth in Table 1.

TABLE 1

| | | |
|---|---|---|
| PC-1 | Bisphenol A polycarbonate resin made by an interfacial process with an Mw of 29,500 (Blendex ® PC105) | GE Plastics |
| PC-2 | BPA polycarbonate resin made by a melt process with an Mw of 28,800. $M_w/M_n$ = 2.5; MVR 300° C./1.2 kg = 7 cc/10 min. Catalyst system was NaOH/Tetra-methyl ammonium hydroxide. Quencher was butyl tosylate. | GE Plastics |
| Light Diffuser 1 | Octaphenyl silsesquioxane (Tospearl ™ 120) | GE Toshiba Silicones |
| Light Diffuser 2 | Barium Sulfate ($BaSO_4$, Velvolux K3) | Sachtleben |
| Colorant | Titanium Dioxide (Coated $TiO_2$, Particle size 5-20 μm) | Kronos |
| UV5411 | UV stabilizer (2-(2-hydroxy-5-t-octylphenyl)-benzotriazole) | Cytec Industries B. V. |
| KSS | Flame retardant salt (potassium diphenylsulphon-3-sulphonate) | Sloss Industries |
| Alkanox ™ 240 | Phosphite stabilizer | Great Lakes Chemical |

Compositions of polycarbonate as listed in table 2 were extruded at 300° C. in a twin screw extruder and chopped into granulate. The granulate was subsequently ground into powder.

All articles were produced using a rotation molding process as follows:

The inner wall of the mold in the rotation molding apparatus was coated with a silicone release agent and inerted with nitrogen. Then the granulate polycarbonate powder was transferred into the rotating spherical mold. Via a heating mantle the mold is heated from 40° C. up to 330° C. over a period of 15 up to 20 minutes under multi-axial rotation until a uniformly dispersed melt is obtained. The temperature is kept at 330° C. for about 3 minutes after which the temperature is brought down to 40° C. over a period of about 15 minutes. After cooling down the obtained globe is taken out of the mold and inspected with respect to aesthetics. Particular attention is paid to crater-like surface defects resembling 'orange skin'. Also the ease of release from the mold is noted. The rotation molding process of one part takes about 50 minutes time. According to this process two types of globes were molded. Both have a wall thickness between 3 and 2.5 mm. The weight of the smallest globe was 1545 grams (circumference 128 cm). The second globe type was 2150 grams (circumference 143.5 cm).

EXAMPLES 1-6

These experiments were undertaken to demonstrate that excellent articles are produced with the method of the present invention. Globes were produced using PC-1 (Ex. 1), PC-2 (Ex. 2) and mixtures of PC-1 and PC-2 (Ex. 3-6). Formulations and results are shown in Table 2 below.

TABLE 2

| | Ex 1* | Ex 2 | Ex. 3* | Ex. 4* | Ex. 5* | Ex 6 |
|---|---|---|---|---|---|---|
| Ingredient (wt %) | | | | | | |
| PC-1 | 99.77 | — | 13.77 | 24.77 | 37.77 | — |
| PC-2 | — | 100 | 86 | 75 | 62 | 99.77 |
| Alkanox ™ 240 | 0.15 | — | 0.15 | 0.15 | 0.15 | 0.15 |
| UV5411 | 0.05 | — | 0.05 | 0.05 | 0.05 | 0.05 |
| KSS | 0.03 | — | 0.03 | 0.03 | 0.03 | 0.03 |

TABLE 2-continued

| | Ex 1* | Ex 2 | Ex. 3* | Ex. 4* | Ex. 5* | Ex 6 |
|---|---|---|---|---|---|---|
| Results | | | | | | |
| Mold release | Bad | Good | Bad | Bad | Bad | Good |
| Surface appearance | Bad | Good | Bad | Bad | Bad | Good |

*Comparative example.

EXAMPLES 7-11

These examples were undertaken to demonstrate that light diffusing articles can be made with compositions according to the invention. In order to test whether formulations are suitable for rotation molding they are submitted to a melt stability test. Rotation molding uses long cycle times and therefore good melt stability is important to obtain consistent results and good surface appearance. Melt stability is tested by measuring the Melt Stability Index defined as the percentage increase in Melt Viscosity Rate (MVR, according ISO 1133, 300° C., 1.2 kg load) at 2 different residence times in the MVR equipment. For this test the Melt Stability Index is defined as the increase in Melt Viscosity Rate measured at residence times of 4 and 12 minutes. The increase in MVR value obtained after 12 minutes dwell time compared to 4 minutes dwell time can be observed as an indication of melt stability. In general it is desirable that the increase in Melt Stability Index value is as low as possible. In one embodiment the increase in Melt Stability index value is less than 8%, preferably less than 6%, more preferably less than 5% when measured at 4 and 12 minutes dwell time respectively. The formulations and results are listed in Table 3.

TABLE 3

| | Ex 7* | Ex 8* | Ex 9 | Ex 10* | Ex 11* |
|---|---|---|---|---|---|
| Ingredient (wt %) | | | | | |
| PC-2 | 99.8 | 97.3 | 99.6 | 97.2 | — |
| Alkanox ™ 240 | 0.05 | 0.05 | 0.05 | 0.05 | — |
| UV5411 | 0.15 | 0.15 | 0.15 | 0.15 | — |
| Light Diffuser 2 | — | 2.5 | — | 2.5 | — |
| Light Diffuser 1 | — | — | 0.2 | — | — |
| Colorant | — | — | — | 0.1 | — |
| Makrolon 3103** | — | — | — | — | 100 |

TABLE 3-continued

|  | Ex 7* | Ex 8* | Ex 9 | Ex 10* | Ex 11* |
|---|---|---|---|---|---|
| Results |  |  |  |  |  |
| MVR (cc/10 min) 4 min dwell | 7.36 | 7.88 | 7.35 | 6.88 | 7.73 |
| MVR (cc/10 min) 12 min dwell | 7.46 | 10.63 | 7.65 | 7.53 | 8.41 |
| Melt Stability Index (%) | 1.4 | 34.9 | 4.1 | 9.4 | 8.8 |

*Comparative example.
**MAKROLON ® 3103-020046 is a trade name of a polycarbonate material made via an interfacial process and supplied by Bayer AG. Analysis of this material suggest it contains 2.5% BaSO$_4$ (Light Diffuser 2) and 0.1% TiO$_2$ (Colorant).

From the results in Table 3 it can be concluded that the composition with Tospearl® 120 (Light Diffuser 1) is clearly superior in melt stability and therefore more suitable for rotation molding than the compositions with BaSO$_4$ (Light Diffuser 2) and TiO$_2$ (Colorant).

EXAMPLES 12-21

These examples were undertaken to show that light diffusive compositions with Tospearl® 120 and the polycarbonate of the present invention have superior color stability at high temperatures and longer residence times than compositions with other light diffusers and therefore are more suitable for rotation molding. Formulations as listed in Table 4 were injection molded at a nominal melt temperature of 330° C. Based on barrel dimensions and shot volume, machine residence time was calculated. Produced plaques (thickness: 2.5 mm) resemble the performance expected with a rotation molding process in which polycarbonate is submitted to an extensive period of time to elevated temperatures. Light transmission (T) and haze (ASTM D1003) are measured on plaques produced after 0.5 min and 24.5 min residence time. The increase in yellowing (delta YI) is measured (ASTM E313-73) for plaques with a machine residence time of 24.5 minutes compared to plaques with a machine residence time of 0.5 minutes. Results can be found in Table 4.

TABLE 4

|  | 12 | 13 | 14 | 15* | 16* | 17 | 18 | 19 | 20* | 21* |
|---|---|---|---|---|---|---|---|---|---|---|
| Ingredient (wt %) |  |  |  |  |  |  |  |  |  |  |
| PC-2 | 99.8 | 99.7 | 99.6 | 97.3 | 99.68 | 99.68 | 99.65 | 99.55 | 97.28 | 97.25 |
| Alkanox ™ 240 | 0.05 | 0.05 | 0.05 | 0.05 | 0.05 | 0.05 | 0.05 | 0.05 | 0.05 | 0.05 |
| UV5411 | 0.15 | 0.15 | 0.15 | 0.15 | 0.15 | 0.15 | 0.15 | 0.15 | 0.15 | 0.15 |
| Light Diffuser 2 | — | — | — | 2.5 | — | — | — | — | 2.5 | 2.5 |
| Light Diffuser 1 | — | 0.1 | 0.2 | — | — | 0.1 | 0.1 | 0.2 | — | — |
| Colorant | — | — | — | — | 0.12 | 0.025 | 0.05 | 0.05 | 0.025 | 0.05 |
| Results |  |  |  |  |  |  |  |  |  |  |
| ΔYI | 0.6 | −0.1 | −0.3 | 3.2 | 0 | 0 | −0.3 | −0.7 | 2.1 | 3.2 |
| T (% 0.5 min) | 90.8 | 81.2 | 69.4 | 83.9 | 34.7 | 47.7 | 41.4 | 40.6 | 50.4 | 35.5 |
| Haze (% 0.5 min) | 0.48 | 98 | 100 | 89 | 100 | 100 | 100 | 100 | 100 | 100 |

*Comparative example

Formulations containing Tospearl® 120 again show less yellowing with increased residence time at 330° C. than formulations containing barium sulfate, which indicates better suitability for use in rotation molding.

The invention claimed is:

1. A method for making a polycarbonate article comprising the steps of:
   1) producing an aromatic polycarbonate by a melt reaction process comprising the steps of:
      a) transesterifying a diaryl carbonate and a dihydroxy compound in the presence of a catalyst system to form an intermediate aromatic polycarbonate, wherein said catalyst system comprises
         (i) an alpha catalyst selected from the group consisting of alkali metal salts and alkaline earth metal salts; and
         (ii) a beta catalyst selected from the group consisting of quaternary ammonium compounds and quaternary phosphonium compounds;
      b) adding to said intermediate aromatic polycarbonate a catalyst quencher; and
   2) rotation molding the polycarbonate into an article at a rotation molding temperature from about 305° C. to about 360° C., wherein said aromatic polycarbonate has a molecular weight from 25,000 up to about 36,000.

2. The method of claim 1 wherein the aromatic polycarbonate is subjected to a grinding step before rotation molding said polycarbonate into an article.

3. The method of claim 1 wherein the rotation molding process has a total residence time of from 25 to 100 minutes.

4. The method of claim 1 wherein the aromatic polycarbonate further comprises from about 0.01 to about 5% by weight of the total composition of a polyalkyl silsesquioxane based diffusing agent, and from about 0 to 0.5% weight of the total composition of a stabilizer.

5. The method of claim 1 wherein the diaryl carbonate is diphenyl carbonate and the dihydroxy compound is bisphenol A.

6. The method of claim 4 wherein the diaryl carbonate is diphenyl carbonate and the dihydroxy compound is bisphenol A.

7. The method of claim 1 wherein the alpha catalyst is selected from the group consisting of NaOH, KOH, and LiOH and combinations thereof, and wherein the beta catalyst is selected from the group consisting of tetramethyl ammonium hydroxide, tetramethyl ammonium acetate, tetrabutyl phosphonium hydroxide and tetrabutyl phosphonium acetate and combinations thereof.

8. The method of claim 1 wherein the quencher is a sulphonic acid or a sulphonic acid ester.

9. The method of claim 8 wherein the quencher is butyl tosylate.

10. The method of claim 1 wherein the aromatic polycarbonate has a Fries level of less than 2000 ppm.

11. An aromatic polycarbonate article, wherein said the aromatic polycarbonate has been produced by a melt transesterification process and the polycarbonate has a weight average molecular weight between 25,000 and about 36,000 and wherein the article has been produced by rotation molding.

12. The article of claim 11 wherein the aromatic polycarbonate has been produced by a transesterification reaction using an alpha, beta catalyst system.

13. The article of claim 11 wherein the polycarbonate has a Melt Stability Index of less than 8%, wherein Melt Stability Index is defined as the percentage increase in MVR (ISO 1133, 300° C., 1.2 kg load) when measured at 4 minutes and 12 minutes dwell time.

14. The article of claim 13 wherein the Melt Stability Index is less than 5%.

15. The article of claim 11 wherein the aromatic polycarbonate has a Fries level of less than 2000 ppm.

16. An aromatic polycarbonate article made from an aromatic polycarbonate composition comprising
  a. an aromatic polycarbonate, wherein the aromatic polycarbonate has a weight average molecular weight between 25,000 and about 36,000;
  b. 0.01 to 5% by weight of the total composition of a polyalkyl silsesquioxane based diffusing agent; and
  c. 0 to 0.5% by weight of the total composition of a stabilizer wherein the article is produced by rotation molding.

17. The article of claim 16 wherein the aromatic polycarbonate has been produced by a transesterification reaction using an alpha, beta catalyst system.

18. The article of claim 16 wherein the polycarbonate has a Melt Stability Index of less than 8%, wherein Melt Stability Index is defined as the percentage increase in MVR (ISO 1133, 300° C., 1.2 kg load) when measured at 4 minutes and 12 minutes dwell time.

* * * * *